(12) United States Patent
Li et al.

(10) Patent No.: US 11,541,479 B2
(45) Date of Patent: Jan. 3, 2023

(54) DISSIMILAR METAL LASER WELDING

(71) Applicant: GM Global Technology Operations LLC, Detroit, MI (US)

(72) Inventors: Huaxin Li, Rochester Hills, MI (US); Liang Wang, Rochester Hills, MI (US); Daniel J. Wilson, Linden, MI (US); Jatinder P. Singh, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 141 days.

(21) Appl. No.: 17/101,316

(22) Filed: Nov. 23, 2020

(65) Prior Publication Data

US 2022/0161362 A1 May 26, 2022

(51) Int. Cl.
| | | |
|---|---|---|
| B23K 26/323 | (2014.01) | |
| B32B 15/01 | (2006.01) | |
| C22C 9/06 | (2006.01) | |
| B23K 33/00 | (2006.01) | |
| B23K 26/211 | (2014.01) | |
| B23K 26/342 | (2014.01) | |
| B23K 26/60 | (2014.01) | |
| B23K 35/30 | (2006.01) | |
| B23K 101/00 | (2006.01) | |

(52) U.S. Cl.
CPC ......... *B23K 26/323* (2015.10); *B23K 26/211* (2015.10); *B23K 26/342* (2015.10); *B23K 26/60* (2015.10); *B23K 33/008* (2013.01); *B23K 35/302* (2013.01); *B32B 15/012* (2013.01); *B32B 15/015* (2013.01); *C22C 9/06* (2013.01); *B23K 2101/006* (2018.08)

(58) Field of Classification Search
None
See application file for complete search history.

(56) References Cited

U.S. PATENT DOCUMENTS

| | | | | |
|---|---|---|---|---|
| 10,625,367 | B2 * | 4/2020 | Sigler | B23K 11/34 |
| 10,857,618 | B2 * | 12/2020 | Sigler | B23K 11/115 |
| 10,857,619 | B2 * | 12/2020 | Brown | C22C 38/16 |
| 2017/0297137 | A1 * | 10/2017 | Perry | C22C 9/00 |

* cited by examiner

*Primary Examiner* — Daniel J. Schleis
(74) *Attorney, Agent, or Firm* — Vivacqua Crane, PLLC

(57) ABSTRACT

A method of welding a component made from a ferrous alloy to a component made from an aluminum alloy includes machining and cleaning a fay surface on the ferrous alloy component, machining and cleaning a fay surface on the aluminum alloy component, depositing a layer of copper alloy material onto the fay surface of the ferrous alloy component, forming a weld groove on at least one of the layer of copper alloy material deposited on the fay surface of the ferrous alloy component and the fay surface of the aluminum alloy component, and laser welding the layer of copper alloy deposited on the fay surface of the ferrous alloy component and the fay surface of the aluminum alloy component to one another.

20 Claims, 2 Drawing Sheets

DISSIMILAR METAL LASER WELDING

INTRODUCTION

The present disclosure relates to a method of welding an aluminum alloy to steel.

The use of aluminum component in automobiles has become more and more popular due to the weight advantages of aluminum. However, certain components, or parts of components, such as gear interfaces or high stress concentration points must still be made from steel, due to inherently higher modulus of elasticity and mechanical strength options, resulting in an improved structural performance. Challenge for the industry has been how to take advantage of both the materials together, while not compromising from the disadvantages, if any, resulting from structural joining of these two materials. Problems occur when aluminum and steel are directly welded to one another, such as the formation of brittle aluminum/iron intermetallic phases.

Thus, while current joining techniques achieve their intended purpose, there is a need for a new and an improved method of welding aluminum components to steel components without forming brittle aluminum/iron intermetallic phases, which weaken the welded joint.

SUMMARY

According to several aspects of the present disclosure, a method of welding a component made from a ferrous alloy to a component made from an aluminum alloy includes machining and cleaning a fay surface of the ferrous alloy component, machining and cleaning a fay surface on the aluminum alloy component, depositing a layer of copper alloy material onto the fay surface of the ferrous alloy component, forming a weld groove on at least one of the layer of copper alloy material deposited on the fay surface of the ferrous alloy component and the fay surface of the aluminum alloy component, and laser welding the layer of copper alloy material deposited on the fay surface of the ferrous alloy component and the fay surface of the aluminum alloy component to one another.

According to another aspect, forming a weld groove on at least one of the layer of copper alloy material deposited on the fay surface of the ferrous alloy component and the fay surface of the aluminum alloy component further includes: machining at least one of the layer of copper alloy material deposited on the fay surface of the ferrous alloy component and the fay surface of the aluminum alloy component to an inclined angle.

According to another aspect, the inclined angle is more than 0 degrees and less than or equal to 45 degrees.

According to another aspect, laser welding the layer of copper alloy material deposited on the fay surface of the ferrous alloy component and the fay surface of the aluminum alloy component to one another further includes: laser welding the layer of copper alloy material deposited on the fay surface of the ferrous alloy component and the fay surface of the aluminum alloy component to one another by laser welding with a copper alloy filler material to join the layer of copper alloy material deposited on the fay surface of the ferrous alloy component and the aluminum alloy component to one another.

According to another aspect, the chemical composition of the copper alloy filler material includes from about 50% to about 70% of copper, from zero to about 30% of nickel, from zero to about 10% of aluminum, from zero to about 10% of iron, from zero to about 8% of manganese, from zero to about 10% of silicon, and from about 0.1% to about 0.5% titanium.

According to another aspect, the layer of copper alloy material deposited on the fay surface of the ferrous alloy component and the copper alloy filler material have the same chemical composition.

According to another aspect, the chemical composition of the layer of copper alloy material deposited on the fay surface of the ferrous alloy component has less nickel content than the chemical composition of the copper alloy filler material.

According to another aspect, laser welding the layer of copper alloy material deposited on the fay surface of the ferrous alloy component and the fay surface of the aluminum alloy component to one another by laser welding with a copper alloy filler material to join the layer of copper alloy material deposited on the fay surface of the ferrous alloy component and the aluminum alloy component to one another further includes: focusing a laser welding laser beam on the copper alloy filler material during the laser welding process to avoid over-heating the fay surface of the aluminum alloy component.

According to another aspect, the method further includes placing the ferrous alloy component and the aluminum alloy component into a fixture to hold the ferrous alloy component and the aluminum alloy component relative to one another prior to laser welding the layer of copper alloy material deposited on the fay surface of the ferrous alloy component and the fay surface of the aluminum alloy component to one another.

According to another aspect, the method further includes moving the fixture relative to a laser welding machine and holding the laser welding machine stationary while welding the layer of copper alloy material deposited on the fay surface of the ferrous alloy component and the fay surface of the aluminum alloy component to one another.

According to another aspect, the method further includes moving a laser welding machine relative to the fixture and holding the fixture stationary while welding the layer of copper alloy material deposited on the fay surface of the ferrous alloy component and the fay surface of the aluminum alloy component to one another.

According to another aspect, depositing a layer of copper alloy material onto the fay surface of the ferrous alloy component includes depositing a layer of copper alloy material onto the fay surface of the ferrous alloy component by a laser deposition process.

According to several aspects of the present disclosure, and automotive part includes a ferrous alloy component having a fay surface machined thereon, a layer of copper alloy material deposited onto the fay surface of the ferrous alloy component, an aluminum alloy component having a fay surface machined thereon, a weld groove formed on at least one of the layer of copper alloy material deposited on the fay surface of the ferrous alloy component and the fay surface of the aluminum alloy component, and a copper alloy filler material laser welded between and interconnecting the layer of copper alloy deposited on the fay surface of the ferrous alloy component and the fay surface of the aluminum alloy component.

According to another aspect, the weld groove includes an inclined angle machined into at least one of the layer of copper alloy material deposited on the fay surface of the ferrous alloy component and the fay surface of the aluminum alloy component.

According to another aspect, the inclined angle is more than 0 degrees and less than or equal to 45 degrees.

According to another aspect, the chemical composition of the copper alloy filler material includes from about 50% to about 70% of copper, from zero to about 30% of nickel, from zero to about 10% of aluminum, from zero to about 10% of iron, from zero to about 8% of manganese, from zero to about 10% of silicon, and from about 0.1% to about 0.5% titanium.

According to another aspect, the layer of copper alloy material deposited on the fay surface of the ferrous alloy component and the copper alloy filler material have the same chemical composition.

According to another aspect, the chemical composition of the layer of copper alloy material deposited on the fay surface of the ferrous alloy component has less nickel content than the chemical composition of the copper alloy filler material.

According to another aspect, the layer of copper alloy material is deposited onto the fay surface of the ferrous alloy component by a laser deposition process.

According to several aspects of the present disclosure, and automotive part includes a ferrous alloy component having a fay surface machined thereon, a layer of copper alloy material deposited by laser deposition onto the fay surface of the ferrous alloy component, an aluminum alloy component having a fay surface machined thereon, a weld groove defined by an inclined angle less than or equal to about 45 degrees machined into at least one of the layer of copper alloy material deposited on the fay surface of the ferrous alloy component and the fay surface of the aluminum alloy component, and a copper alloy filler material laser welded between and interconnecting the layer of copper alloy material deposited on the fay surface of the ferrous alloy component and the fay surface of the aluminum alloy component, the chemical composition of the copper alloy filler material including from about 50% to about 70% of copper, from zero to about 30% of nickel, from zero to about 10% of aluminum, from zero to about 10% of iron, from zero to about 8% of manganese, from zero to about 10% of silicon, and from about 0.1% to about 0.5% titanium.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
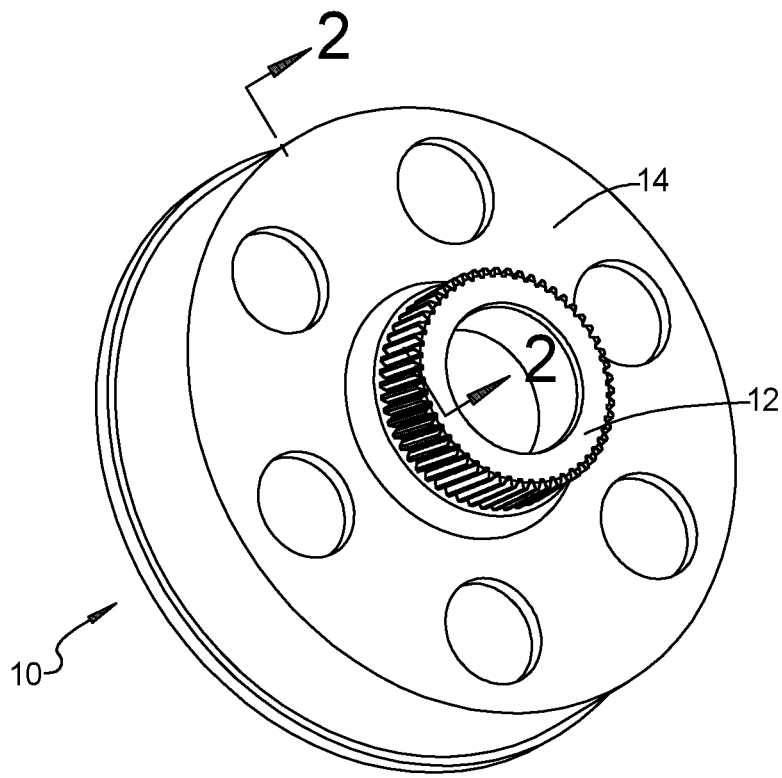
FIG. 1 is a perspective view of an automotive part in accordance with an exemplary embodiment of the present disclosure.
Figure 2:
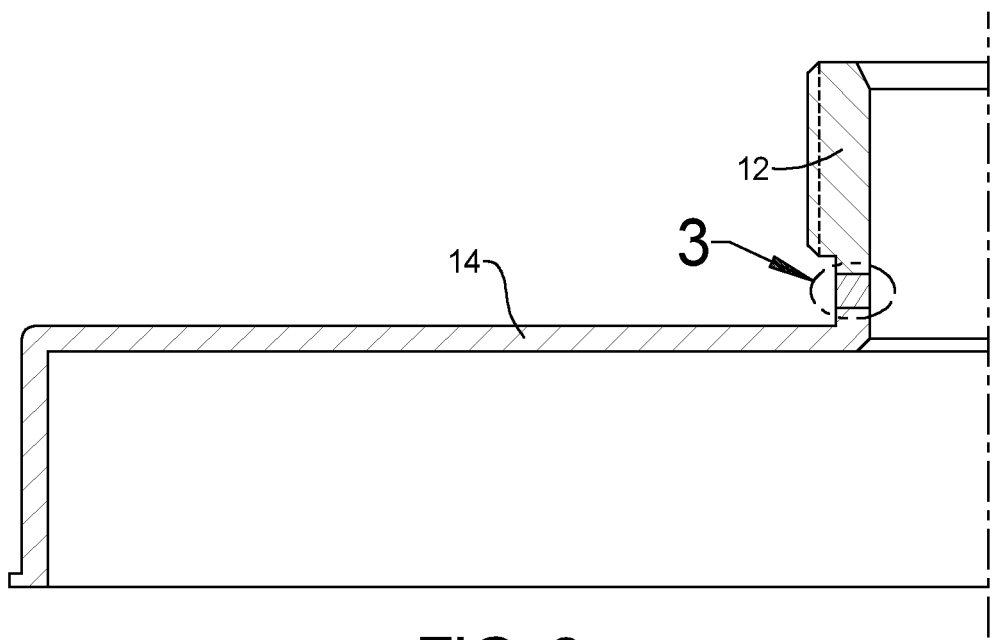
FIG. 2 is a sectional view taken along line 2-2 in FIG. 1.

Referring to FIG. 1 and FIG. 2, an automotive part 10 includes a ferrous alloy component 12 welded onto an aluminum alloy component 14. As shown in FIG. 1 and FIG. 2, the automotive part 10 is a hub having a gear welded thereon. The hub is made from an aluminum alloy to save weight. The gear is made from steel to provide strength and durability needed for the gear teeth.

Figure 3:
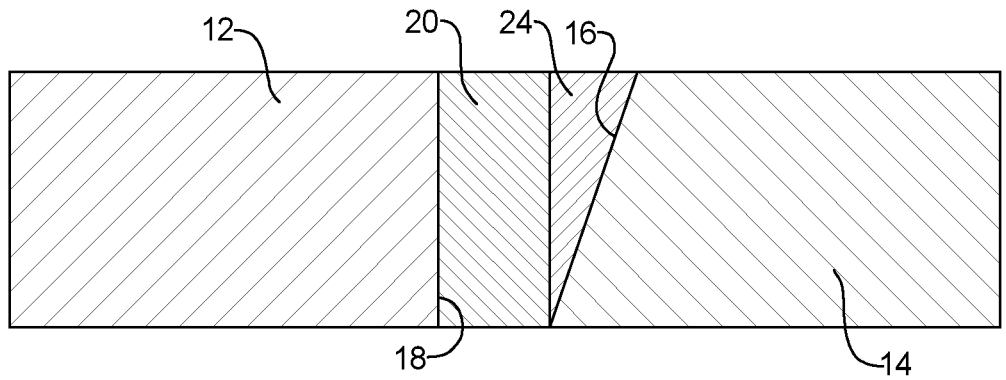
FIG. 3 is an enlarged view of a portion of FIG. 2, as indicated by the dashed circle labelled FIG. 3 in FIG. 2.

Referring to FIG. 3, the aluminum alloy component 14 has a fay surface 16 machined thereon and the ferrous alloy component 12 has a fay surface 18 machined thereon. The fay surfaces 16, 18 of the ferrous alloy component 12 and the aluminum alloy component 14 are surfaces that have been machined and washed in preparation for the ferrous alloy component 12 and the aluminum alloy component 14 to be welded together at the corresponding fay surfaces 16, 18.

The fay surface 18 of the ferrous alloy component 12 includes a layer of copper alloy material 20 deposited thereon. A weld groove 22 is formed on at least one of the layer of copper alloy material 20 deposited on the fay surface 18 of the ferrous alloy component 12 and the fay surface 16 of the aluminum alloy component 14. A copper alloy filler material 24 is laser welded between and interconnects the layer of copper alloy 20 deposited on the fay surface 18 of the ferrous alloy component 12 and the fay surface 16 of the aluminum alloy component 14.

The layer of copper alloy material 20 bonds well to the ferrous alloy component 12 and provides a strong bond between the fay surface 18 of the ferrous alloy component 12 and the layer of copper alloy material 20. In an exemplary embodiment, the layer of copper alloy material 20 is deposited onto the fay surface 18 of the ferrous alloy component 12 by laser deposition.

The chemical composition of the copper alloy filler material 24 includes from about 50% to about 70% of copper, from zero to about 30% of nickel, from zero to about 10% of aluminum, from zero to about 10% of iron, from zero to about 8% of manganese, from zero to about 10% of silicon, and from about 0.1% to about 0.5% titanium. This high nickel content copper alloy filler material 24 fills the weld groove 22 and bonds well with both the layer of copper alloy material 20 deposited onto the fay surface 18 of the ferrous alloy component 12 and the fay surface 16 of the aluminum alloy component 14, thereby forming a strong fusion joint between the ferrous alloy component 12 and the aluminum alloy component 14.

Figure 4:
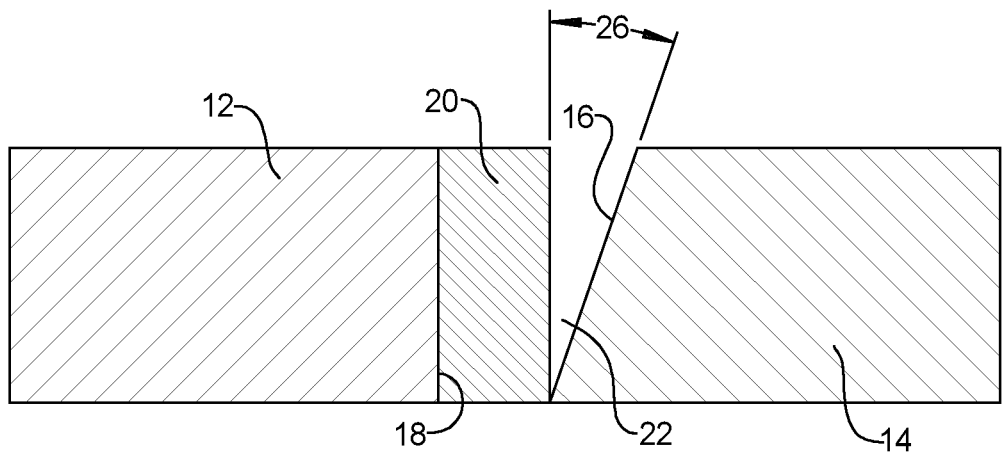
FIG. 4 is an enlarged view similar to FIG. 3, prior to welding the aluminum alloy component and the ferrous alloy component together.
Figure 5:
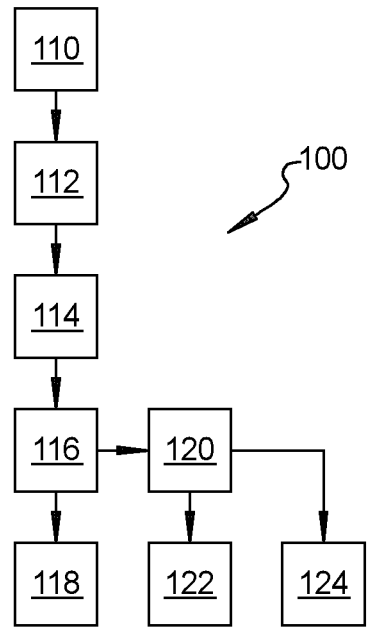
FIG. 5 is a flow chart illustrating a method of welding a component made from a ferrous alloy to a component made from an aluminum alloy according to an exemplary embodiment.

Referring to FIG. 4, prior to welding, the weld groove 22 includes an inclined angle 26 machined into at least one of the layer of copper alloy 20 deposited on the fay surface 18 of the ferrous alloy component 12 and the fay surface 16 of the aluminum alloy component 14. The weld groove 22 creates a gap between the layer of copper alloy material 20 deposited onto the fay surface 18 of the ferrous alloy component 12 and the fay surface 16 of the aluminum alloy component 14 to allow the copper alloy filler material 24 to bond to the entire area of the layer of copper alloy material 20 deposited onto the fay surface 18 of the ferrous alloy component 12 and the fay surface 16 of the aluminum alloy component 14. In an exemplary embodiment, the inclined angle 26 is more than 0 degrees and less than or equal to 45 degrees.

In an exemplary embodiment, the layer of copper alloy material 20 deposited on the fay surface 18 of the ferrous alloy component 12 and the copper alloy filler material 24 have the same chemical composition. In another exemplary embodiment, the chemical composition of the layer of copper alloy material 20 deposited on the fay surface 18 of the ferrous alloy component 12 has less nickel content than the chemical composition of the copper alloy filler material 24. A higher nickel content in the copper alloy filler material 24 increases the strength and weldability between the layer of copper alloy material 20 on the fay surface 18 of the ferrous alloy component 12 and the fay surface 16 of the aluminum alloy component 14.

Referring to FIG. 4, a flow chart illustrating a method 100 of welding a component made from a ferrous alloy to a component made from an aluminum alloy is shown. Starting at block 110, the method 100 includes machining and cleaning a fay surface 18 on the ferrous alloy component 12, and at block 112, machining and cleaning a fay surface 16 on the aluminum alloy component 14. Moving on to block 114, the method includes depositing a layer of copper alloy material 20 onto the fay surface 18 of the ferrous alloy component 12. In an exemplary embodiment, depositing the layer of copper alloy material 20 onto the fay surface 18 of the ferrous alloy component 12 includes depositing the layer of copper alloy material 20 onto the fay surface 18 of the ferrous alloy component 12 by a laser deposition process.

Moving on to block 116, the method 100 includes forming a weld groove 22 on at least one of the layer of copper alloy material 20 deposited on the fay surface 18 of the ferrous alloy component 12 and the fay surface 16 of the aluminum alloy component 14.

In an exemplary embodiment, the weld groove 22 is formed by machining at least one of the layer of copper alloy material 20 deposited on the fay surface 18 of the ferrous alloy component 12 and the fay surface 16 of the aluminum alloy component 14 to an inclined angle 26. In another exemplary embodiment, the inclined angle 26 is more than 0 degrees and less than or equal to 45 degrees.

Moving on to block 118, the method 100 includes laser welding the layer of copper alloy material 20 deposited on the fay surface 18 of the ferrous alloy component 12 and the fay surface 16 of the aluminum alloy component 14 to one another.

In an exemplary embodiment, the ferrous alloy component 12 and the aluminum alloy component 14 are laser welded by laser welding with a copper alloy filler material 24 to join the layer of copper alloy material 20 deposited on the fay surface 18 of the ferrous alloy component 12 and the aluminum alloy component 14 to one another.

In another exemplary embodiment, the chemical composition of the copper alloy filler material 24 includes from about 50% to about 70% of copper, from zero to about 30% of nickel, from zero to about 10% of aluminum, from zero to about 10% of iron, from zero to about 8% of manganese, from zero to about 10% of silicon, and from about 0.1% to about 0.5% titanium. The layer of copper alloy material 20 deposited on the fay surface 18 of the ferrous alloy component 12 and the copper alloy filler material 24 can have the same chemical composition, or alternatively, the chemical composition of the layer of copper alloy material 20 deposited on the fay surface 18 of the ferrous alloy component 12 has less nickel content than the chemical composition of the copper alloy filler material 24.

During the welding of the layer of copper alloy material 20 deposited on the fay surface 18 of the ferrous alloy component 12 and the fay surface 16 of the aluminum alloy component 14 to one another, a welding laser is focused on the copper alloy filler material 24 during the laser welding process. This is done to avoid over-heating the fay surface 16 of the aluminum alloy component 14.

Moving to block 120, to insure that the ferrous alloy component 12 and the aluminum alloy component 14 remain positioned relative to one another at a proper orientation during welding, the method 100 may further include placing the ferrous alloy component 12 and the aluminum alloy component 14 into a fixture to hold the ferrous alloy component 12 and the aluminum alloy component 14 relative to one another prior to laser welding the layer of copper alloy material 20 deposited on the fay surface 18 of the ferrous alloy component 12 and the fay surface 16 of the aluminum alloy component 14 to one another.

Moving to block 122, the fixture may be adapted to move relative to a stationary welding machine, the method 100 including moving the fixture relative to the laser welding machine and holding the laser welding machine stationary while welding the layer of copper alloy material 20 deposited on the fay surface 18 of the ferrous alloy component 12 and the fay surface 16 of the aluminum alloy component 14 to one another.

Alternatively, moving to block 124, the fixture may be stationary, and the laser welding machine adapted to move relative to the fixture, wherein the method 100 includes moving the laser welding machine relative to the fixture and holding the fixture stationary while welding the layer of copper alloy material 20 deposited on the fay surface 18 of the ferrous alloy component 12 and the fay surface 16 of the aluminum alloy component 14 to one another.

A method of welding a component made from a ferrous alloy to a component made from an aluminum alloy of the present disclosure offers the advantage of forming a strong fusion bond between the ferrous alloy component 12 and the aluminum alloy component 14 that does not include brittle aluminum/iron intermetallic phases that would be formed if the ferrous alloy component 12 was welded directly to the aluminum alloy component 14.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of welding a component made from a ferrous alloy to a component made from an aluminum alloy, comprising:
    machining and cleaning a fay surface on the ferrous alloy component;
    machining and cleaning a fay surface on the aluminum alloy component;
    depositing a layer of copper alloy material onto the fay surface of the ferrous alloy component;
    forming a weld groove on at least one of the layer of copper alloy material deposited on the fay surface of the ferrous alloy component and the fay surface of the aluminum alloy component; and
    laser welding the layer of copper alloy material deposited on the fay surface of the ferrous alloy component and the fay surface of the aluminum alloy component to one another.

2. The method of claim 1, wherein forming a weld groove on at least one of the layer of copper alloy material deposited on the fay surface of the ferrous alloy component and the fay surface of the aluminum alloy component further includes:
    machining at least one of the layer of copper alloy material deposited on the fay surface of the ferrous alloy component and the fay surface of the aluminum alloy component to an inclined angle.

3. The method of claim 2, wherein the inclined angle is more than 0 degrees and less than or equal to 45 degrees.

4. The method of claim 3, wherein laser welding the layer of copper alloy material deposited on the fay surface of the ferrous alloy component and the fay surface of the aluminum alloy component to one another further includes: laser welding the layer of copper alloy material deposited on the fay surface of the ferrous alloy component and the fay surface of the aluminum alloy component to one another by laser welding with a copper alloy filler material to join the layer of copper alloy material deposited on the fay surface of the ferrous alloy component and the aluminum alloy component to one another.

5. The method of claim 4, wherein the chemical composition of the copper alloy filler material includes:
from about 50% to about 70% of copper;
from zero to about 30% of nickel;
from zero to about 10% of aluminum;
from zero to about 10% of iron;
from zero to about 8% of manganese;
from zero to about 10% of silicon; and
from about 0.1% to about 0.5% titanium.

6. The method of claim 5, wherein the layer of copper alloy material deposited on the fay surface of the ferrous alloy component and the copper alloy filler material have the same chemical composition.

7. The method of claim 5, wherein the chemical composition of the layer of copper alloy material deposited on the fay surface of the ferrous alloy component has less nickel content than the chemical composition of the copper alloy filler material.

8. The method of claim 4, wherein laser welding the layer of copper alloy material deposited on the fay surface of the ferrous alloy component and the fay surface of the aluminum alloy component to one another by laser welding with a copper alloy filler material to join the layer of copper alloy material deposited on the fay surface of the ferrous alloy component and the aluminum alloy component to one another further includes: focusing a laser welding laser beam on the copper alloy filler material during the laser welding process to avoid over-heating the aluminum alloy fay surface.

9. The method of claim 4, further including: placing the ferrous alloy component and the aluminum alloy component into a fixture to hold the ferrous alloy component and the aluminum alloy component relative to one another prior to laser welding the layer of copper alloy material deposited on the fay surface of the ferrous alloy component and the fay surface of the aluminum alloy component to one another.

10. The method of claim 9, further including moving the fixture relative to a laser welding machine and holding the laser welding machine stationary while welding the layer of copper alloy material deposited on the fay surface of the ferrous alloy component and the fay surface of the aluminum alloy component to one another.

11. The method of claim 9, further including moving a laser welding machine relative to the fixture and holding the fixture stationary while welding the layer of copper alloy material deposited on the fay surface of the ferrous alloy component and the fay surface of the aluminum alloy component to one another.

12. The method of claim 1, wherein depositing a layer of copper alloy material onto the fay surface of the ferrous alloy component includes depositing a layer of copper alloy material onto the fay surface of the ferrous alloy component by a laser deposition process.

13. An automotive part including:
a ferrous alloy component having a fay surface machined thereon;
a layer of copper alloy material deposited onto the fay surface of the ferrous alloy component;
an aluminum alloy component having a fay surface machined thereon;
a weld groove formed on at least one of the layer of copper alloy material deposited on the fay surface of the ferrous alloy component and the fay surface of the aluminum alloy component; and
a copper alloy filler material laser welded between and interconnecting the layer of copper alloy material deposited on the fay surface of the ferrous alloy component and the fay surface of the aluminum alloy component.

14. The automotive part of claim 13, wherein the weld groove includes an inclined angle machined into at least one of the layer of copper alloy material deposited on the fay surface of the ferrous alloy component and the fay surface of the aluminum alloy component.

15. The automotive part of claim 14, wherein the inclined angle is more than 0 degrees and less than or equal to 45 degrees.

16. The automotive part of claim 15, wherein the chemical composition of the copper alloy filler material includes:
from about 50% to about 70% of copper;
from zero to about 30% of nickel;
from zero to about 10% of aluminum;
from zero to about 10% of iron;
from zero to about 8% of manganese;
from zero to about 10% of silicon; and
from about 0.1% to about 0.5% titanium.

17. The automotive part of claim 16, wherein the layer of copper alloy material deposited on the fay surface of the ferrous alloy component and the copper alloy filler material have the same chemical composition.

18. The automotive part of claim 16, wherein the chemical composition of the layer of copper alloy material deposited on the fay surface of the ferrous alloy component has less nickel content than the chemical composition of the copper alloy filler material.

19. The automotive part of claim 1, wherein the layer of copper alloy material is deposited onto the fay surface of the ferrous alloy component by a laser deposition process.

20. An automotive part including:
a ferrous alloy component having a fay surface machined thereon;
a layer of copper alloy material deposited by laser deposition onto the fay surface of the ferrous alloy component;
an aluminum alloy component having a fay surface machined thereon;
a weld groove defined by an inclined angle less than or equal to about 45 degrees machined into at least one of the layer of copper alloy material deposited on the fay surface of the ferrous alloy component and the fay surface of the aluminum alloy component; and
a copper alloy filler material laser welded between and interconnecting the layer of copper alloy material deposited on the fay surface of the ferrous alloy component and the fay surface of the aluminum alloy component, the chemical composition of the copper alloy filler material including:
from about 50% to about 70% of copper;

from zero to about 30% of nickel;
from zero to about 10% of aluminum;
from zero to about 10% of iron;
from zero to about 8% of manganese;
from zero to about 10% of silicon; and
from about 0.1% to about 0.5% titanium.

\* \* \* \* \*